United States Patent [19]

Rogers

[11] Patent Number: 4,514,048

[45] Date of Patent: Apr. 30, 1985

[54] VARIABLE FOCUS ELASTOMERIC LENS SYSTEM

[75] Inventor: Howard G. Rogers, Weston, Mass.

[73] Assignee: Polaroid Corporation, Cambridge, Mass.

[21] Appl. No.: 293,230

[22] Filed: Aug. 17, 1981

[51] Int. Cl.³ .................. G02B 3/10; G02B 15/00; G02C 7/08

[52] U.S. Cl. .................. 350/423; 350/437; 351/168

[58] Field of Search ............ 350/418, 437, 423; 351/168, 95, 169

[56] References Cited

U.S. PATENT DOCUMENTS

| | | | |
|---|---|---|---|
| 60,109 | 11/1866 | Woodward | 350/418 |
| 504,890 | 9/1893 | Ohmart | 350/418 |
| 708,365 | 9/1902 | Kliegl et al. | 350/418 |
| 1,269,422 | 6/1918 | Gordon | 350/418 |
| 1,955,690 | 4/1934 | Spill | 351/95 X |
| 2,165,078 | 7/1939 | Toulon | 350/418 |
| 2,269,905 | 1/1942 | Graham | 350/418 |
| 2,300,251 | 10/1942 | Flint | 350/418 |
| 3,161,718 | 12/1964 | DeLuca | 350/418 |

OTHER PUBLICATIONS

Caudell et al., "Active Optics with RTV Silicone Rubber", *SPIE*, vol. 115, Advances in Replicated & Plastic Optics, pp. 18-24.

Primary Examiner—John K. Corbin
Assistant Examiner—Scott J. Sugarman
Attorney, Agent, or Firm—Francis J. Caufield

[57] ABSTRACT

A variable focus lens system comprising an elastomeric lens structured to undergo shape changes and corresponding focal length changes in a continuous manner over a predetermined range in response to variations in a tensile stress uniformly distributed around the peripheral edges of the lens element. The lens element is preferably structured of silicon rubber materials which are molded around an extensible and contractable annular coil spring arrangement which is utilized to apply the required variable tensile stress.

11 Claims, 4 Drawing Figures

4,514,048

VARIABLE FOCUS ELASTOMERIC LENS SYSTEM

BACKGROUND OF THE INVENTION

1. Field of the Invention

This invention in general relates to variable focus lenses and in particular to an elastomeric variable focus lens element which can have its focus continuously changed over a predetermined range in response to a variable tensile stress uniformly applied around the peripheral edges of the element.

2. Description of the Prior Art

Several types of variable focus lens systems are well-known in the optical arts. The type most commonly found in practice is perhaps the multi-element glass lens that is optically structured so that its focus can be continuously varied by changing the axial air spacing between its elements through the use of movable mechanical lens mounts.

Another type of variable focus lens system utilizes a pair of optical refracting plates having surfaces which are specially configured to in combination continuously define spherical lenses having different focal lengths as the plates are displaced with respect to one another transverse to their respective optical axis. As an example of this type lens, reference may be had to U.S. Pat. No. 3,305,294 issued to L. W. Alvarez on Feb. 21, 1967 and entitled "Two-Element Variable-Power Spherical Lens" or to U.S. Pat. No. 3,583,790 issued to James G. Baker on June 8, 1971 and entitled "Variable Power, Analytic Function, Optical Component In The Form Of A Pair Of Laterally Adjustable Plates Having Shaped Surfaces, And Optical Systems Including Such Components". Such refracting plate systems as is well-known may be used separately or in combination with other components to effect optical power changes for purposes of focusing and, as indicated in the Baker patent, supra, can also be favorably corrected for aberrations.

Another known variable focus lens is the fluid or gas type. In this type, flexible transparent membranes or plates generally are mounted in a support housing to define one or more chambers which can be selectively filled with a fluid, gas or jelly having a suitable index of refraction. The pressure or volume of the contents of each chamber can be adjusted so that the membranes or plates deform in a predictable manner while the fluid assumes the interior shape of the chamber to define a lens. In the case where more than one chamber is utilized, it is possible to correct for spherical and chromatic aberrations. Examples of fluid lenses are shown and described in U.S. Pat. No. 2,300,251 issued to E. F. Flint on Oct. 27, 1942 and entitled "Variable Focus Lens" and U.S. Pat. No. 3,161,718 issued to W. V. DeLuca on Dec. 15, 1964 and entitled "Variable Power Fluid Lens".

It is obvious that the variable focus lens is of fundamental importance in the practice of the optical arts as is evidenced by the various types which have been devised by those skilled in the art and discussed above. Equally apparen is the fact that each type of variable focus lens has advantages and disadvantages depending on the particular application. The fluid type lenses, for example, can be made quite large and can result in considerable savings in weight and space compared with a comparable glass system.

Because the variable focus lens is of such fundamental importance, it is a primary object of the present invention to provide an elastomeric type variable focus lens for use in the optical arts.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention in general relates to variable focus lenses and in particular to a variable focus lens system having a focal length that can be continuously changed over a predetermined range in response to variations in tensile stress substantially uniformly distributed around the peripheral edges of an element of the system.

The lens system of the invention comprises a lens element formed of at least one transparent, elastomeric material selectively shaped to provide the lens element with a predetermined focus when the lens element is in a relaxed state.

Additionally included in the lens system are means structured for exerting a continuously variable tensile stress substantially uniformly distributed around the peripheral edges of the lens element to alter the relaxed shape of the lens element in a predetermined manner so that the focus of the lens element can be changed in a continuous manner over a predetermined range.

In one embodiment, the lens element of the invention comprises a composite, biconvex structure formed of a transparent, homogeneous elastomeric material having predetermined elastic properties, refractive index, and shape and a second transparent elastomeric material, having predetermined elastic properties, refractive index and shape different from those of the first elastomeric material and overlying the first elastomeric material so that the interior shape of the second elastomeric material is complementary to the exterior shape of the first elastomeric material. The first and second elastomeric materials are bonded to one another at an interface and in combination operate to provide the lens element with a predetermined focus when the lens element is in a relaxed state. Preferably both materials are silicon rubber compounds with the interior material being more elastic than the material overlying it so that the overlying material acts to compress and elongate the interior material as the exterior material is stretched.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

DESCRIPTION OF THE PREFERRED EMBODIMENT

Figure 1:
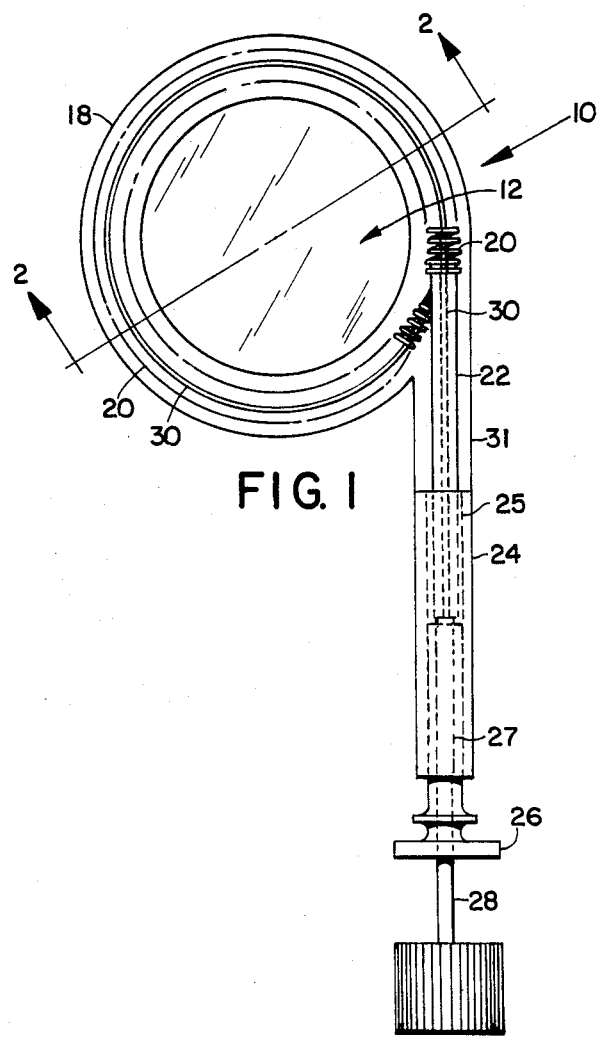
FIG. 1 is an enlarged plan view of the variable focus lens system of the invention.
Figure 2:
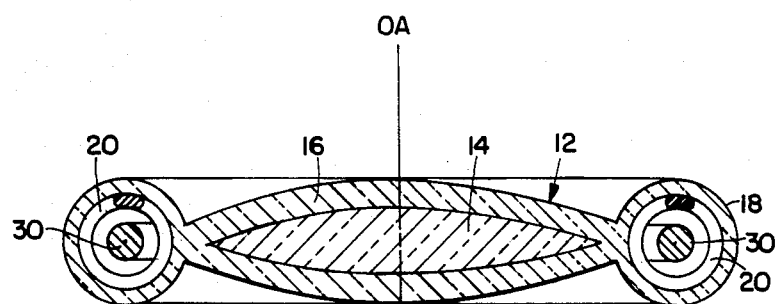
FIG. 2 is an enlarged sectional view of the lens system of FIG. 1 taken generally along line 2—2 in FIG. 1.

The preferred embodiment of the variable focus lens system of the invention is designated at 10 in FIG. 1. The lens system 10, as best shown in FIG. 2, comprises a transparent, biconvex, central lens element 12. The lens element 12 is of composite structure and includes an inner core 14 that is formed of a transparent homogeneous elastomeric material in the shape of a positive lens element. Overlying the inner core 14 is a uniformly thick outer layer 16 formed of a second transparent, elastomeric material which is bonded to the surface of the inner core 14 to, in combination therewith, provide the lens element 12 with a predetermined focus when the lens element 12 is in a relaxed state.

The inner core 14 and the outer layer 16 each are preferably formed of a silicon rubber compound with the inner core 14 consisting of material which has a higher index of refraction than that of the outer layer 16 surrounding it. In addition, the outer layer 16 is specifically chosen so that it has a higher modulus of elasticity than that of the inner core 14.

Surrounding the circumferential edges of the lens element 12 is an annular tube 18 which is integrally formed with the outer lens element layer 16 and having the same material composition as the layer 16. Within the hollow core of the annular tube 18 there is located a coil spring 20, both ends of which are fixedly attached to a hollow post 22 which is pressed into, or otherwise fixedly attached to, a generally rectangular shaped block 24 (see FIG. 1).

Figure 3:
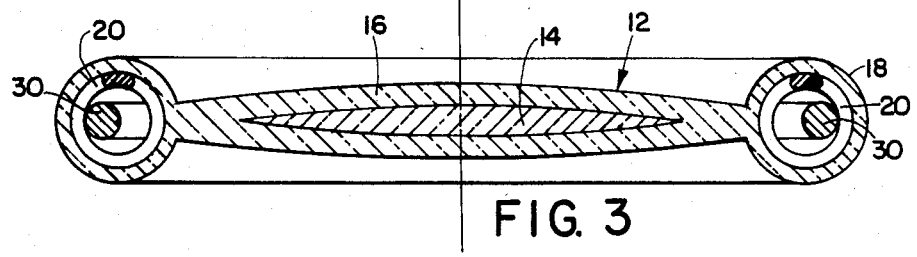
FIG. 3 is an enlarged sectional view similar to that of FIG. 2 but showing the invention in another position.

Extending through the coil spring 20 is a flexible wire 30 having one end fixedly attached to the post 22. The free end of the wire 30 extends through and is guided by the post 22 and thereafter loosely butts against the top of an adjustment screw 28. The adjustment screw 28 fits into a complementary threaded hole 27 located within another adjustment screw 26 which in turn fits into a complementary threaded hole 25 in the block 24. As is readily apparent, clockwise rotation of either of the adjustment screws, 26 or 28, will create a pushing force against the end of the wire 30 which is butted against the tip of the adjustment screw 28 and this action increases the length of the wire 30 within the coil spring 20 thereby causing the coil spring 20 to radially expand in a uniform manner. The radial expansion of the coil spring 20 in turn causes it to bear against the inner walls of the tube 18 to create a radial force against the inner walls of the annular tube 18 which is uniformly distributed therearound. This radial force in turn is transferred to the circumferential edges of the central lens element 12 via the outer layer 16 of the lens element 12. The placement of the lens element outer layer 16 in tension causes it to stretch since it is an elastomeric material. As the outer layer 16 stretches, it simultaneously transfers a compressive stress to the inner core 14 in the direction of the optical axis of the lens element 12 and also causes the inner core 14 to be placed under a radial stress so as to be stretched because of the bonded interface between the outer layer 16 and the inner core 14. The action of the combined stresses which are transferred from the outer layer 16 to the inner core 14 causes the central lens element 12 to be deformed in the manner shown in FIG. 3 whereby the relaxed shape of the lens element 12 is altered so that the focus of the lens element is changed because of its change in shape. The double adjustment screw arrangement (26 and 28) allows the wire 30 to be extended over a greater length than would otherwise be possible with a single screw taking up the same space.

In the foregoing manner, means are provided which are structured for exerting a continuously variable tensile stress substantially uniformly distributed around the peripheral edges of the lens element 12 to alter its relaxed shape in a predetermined manner so that its focus can be changed in a continuous manner over a predetermined range. For the configuration of the preferred embodiment, those skilled in the optical arts will recognize that the focal length of the lens system 10 is lengthened when it is placed in a stressed condition compared with its focal length when it is in a relaxed state.

The silicon rubber compounds chosen for the inner core 14 and the outer layer 16 in one example had refractive indices of 1.45 and 1.4, respectively, and the radius of curvature for the lens element 12 was 10 inches. With these combinations, it was possible to achieve a focal length increase of approximately 46% compared with the relaxed state for the lens system 10.

It is clear that most of the optical power changes take place within the inner core 14 because of its higher index of refraction and relatively larger shape changes. This particular arrangement of using a composite lens structure of elastomeric materials having an outer layer of relatively higher strength which is placed in tension in a uniform manner with a relatively more elastic material of higher index placed within the inner core provides a means by which the generally spherical shape of the relaxed lens is retained as it is stretched because the composite structure tends to mitigate non-uniform radial stresses associated with the changing cross-sectional shape of a convex lens.

The lens system 10 is preferably fabricated by first constructing the mechanical tensioning system and then utilizing casting or molding techniques suitable for elastomeric compounds to caste the central lens element 12 and the annular tube 18 over the coil spring 30. To facilitate this fabrication technique, the material utilized to form the outer layer 16 is preferably cast over the post 22 thereby forming an elastomeric section between the annular tube 18 and the block 24 which is shown in FIG. 1 and designated generally a 31.

Figure 4:
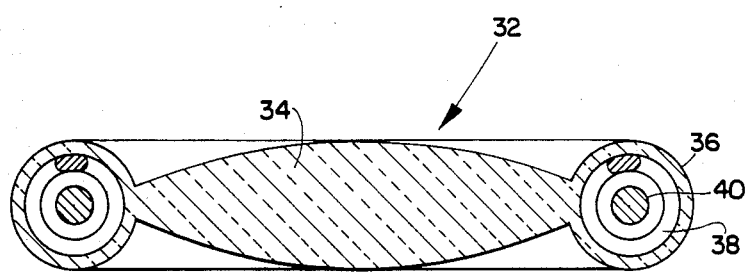
FIG. 4 is an enlarged sectional view similar to FIG. 2 but for an alternate embodiment of the invention.

The lens system 10 may be used for ophthalmic purposes or as an element in a system to change the overall power of the system in a continuous manner. However, in applications where small power changes are required and where a well-corrected lens is not required, an alternate embodiment of the invention comprising only one material may be utilized. Such an alternate embodiment is shown in FIG. 4 and is designated generally at 32. As can be seen in FIG. 4, the central lens element, which is designated at 34, consists of only a single elastomeric material rather than the composite system of the preferred embodiment. Again, an annular ring is provided and integrally formed with the central lens element 34 and is designated generally at 36. Within the central hollow section of the annular ring 36 is provided a coil spring 38 as before and within the coil spring a wire 40, again as shown for use in the preferred embodiment.

It will be obvious to those skilled in the art that other changes may be made in the above-described embodiments without departing from the scope of the invention. For example, the central lens element of the invention may have other initial relaxed cross-sectional shapes which can thereafter be stretched to take on other shapes. Therefore, it is intended that all matter contained in the above description or shown in the accompanying drawings shall be interpreted as illustrative and not in a limiting sense.

What is claimed is:

1. A variable focus lens system comprising:
    a single lens element formed of at least one transparent, homogeneous, solid, elastomeric material selectively shaped to provide said lens element with a predetermined optical power when said lens element is in a relaxed state; and
    means for supporting said lens element about its peripheral edges while in said relaxed state and for exerting a continuously variable tensile stress directly to and substantially uniformly distributed around the peripheral edges of said lens element to alter the relaxed shape of said lens element in a predetermined manner so that said optical power of said lens element can be changed in a continuous manner over a predetermined range.

2. The lens system of claim 1 wherein said lens element is formed of at least one silicon rubber compound.

3. The lens system of claim 1 wherein:
    (a) said lens element is rotationally symmetric about a central axis therethrough;
    (b) said stress exerting means comprises a coil spring surrounding the periphery of said lens element and means by which said coil spring can be selectively caused to radially expand and contract with respect to said lens element central axis; and
    (c) means for attaching said lens element circumferential edge to said coil spring so that the expansive and contractive movement of said coil spring is transmitted to said lens element to alter the shape thereof.

4. The lens system of claim 3 wherein said means for attaching said lens element circumferential edge to said coil spring comprises a generally annular shaped tube integrally formed as an extension of said lens element circumferential edge and molded around said coil spring.

5. The lens system of claim 4 wherein said means for selectively causing said coil spring to radially expand and contract comprises:
    (a) a support block having both ends of said coil spring fixedly attached thereto so that said coil spring forms a generally closed loop with both ends thereof immovable with respect to said support block;
    (b) a flexible wire extending through the center of said coil spring and having one end fixed with respect to said block and the other end thereof movably mounted with respect to said block; and
    (c) means for selectively moving said wire with respect to said block so that the length of said wire within said coil spring can be progressively made greater or less than said central circumference of said coil spring whereby said coil spring can be made to circumferentially extend and simultaneously therewith radially expand to exert said variable stress on said lens element circumferential edge.

6. A variable focus lens system comprising:
    a single lens element of composite construction formed of a first transparent, homogeneous, solid, elastomeric material having predetermined elastic properties, refractive index, and shape and a second, solid, transparent elastomeric material, having predetermined elastic properties, refractive index and shape different from those of said first elastomeric material and overlying said first elastomeric material so that the interior shape of said second elastomeric material is complementary to the exterior shape of said first elastomeric material, said first and second elastomeric materials being bonded to one another at their interface and in combination operating to provide said lens element with a predetermined optical power when said lens element is in a relaxed state; and
    means for supporting said lens element about its peripheral edges while in said relaxed state and for exerting a continuously variable tensile stress directly to and substantially uniformly distributed around the peripheral edges of said lens element second material to alter said relaxed shape of said lens element in a predetermined manner so that said optical power of said lens element can be changed in a continuous manner over a predetermined range.

7. The lens system of claim 6 wherein said first elastomeric material has a higher index of refraction than does said second elastomeric material.

8. The lens system of claim 6 wherein the modulus of elasticity for said second elastomeric material is higher than that for said first elastomeric material.

9. The lens system of claims 6, 7, or 8 wherein each of said elastomeric materials comprises a silicon rubber compound.

10. A variable focus lens system comprising:
    a lens element rotationally symmetric about a central axis therethrough and formed of at least one transparent homogeneous elastomeric material selectively shaped to provide said lens element with a predetermined focus when said lens element is in a relaxed state, said lens element additionally including around its circumferential edge a generally annular shaped tube integrally formed as an extension of said lens element circumferential edge; and
    means structured for exerting a continuously variable tensile stress substantially uniformly distributed around the peripheral edges of said lens element in a predetermined manner so that the focus of said lens element can be changed in a continuous manner over a predetermined range, said stress exerting means comprising a coil spring surrounding the periphery of said lens element and contained within said lens element annular shaped tube and means by which said coil spring can be selectively caused to radially expand and contract with respect to said lens element central axis, said lens element annular shaped tube serving to attach said lens element circumferential edge to said coil spring so that the expansive and contractive movement of said coil spring is transmitted to said lens element to alter the shape thereof, and wherein said means for selectively causing said coil spring to radially expand and contract comprises:
    (a) a support block having both ends of said coil spring fixedly attached thereto so that said coil spring forms a generally closed loop with both ends thereof immovable with respect to said support block;
    (b) a flexible wire extending through the center of said coil spring and having one end fixed with respect to said block and the other end thereof movably mounted with respect to said block; and (c) means for selectively moving said wire with respect to said block so that the length of said wire within said coil spring can be progressively made greater or less than said central circumference of said coil spring whereby said coil spring can be made to circumferentially extend and simultaneously therewith radially expand to exert said variable stress on said lens element circumferential edge.

11. A variable focus lens system comprising:

a lens element rotationally symmetric about a central axis therethrough, said lens element formed of at least one transparent, homogeneous elastomeric material selectively shaped to provide said lens element with a predetermined focus when said lens element is in a relaxed state; and means structured for exerting a continuously variable tensile stress substantially uniformly distributed around the peripheral edges of said lens element to alter the relaxed shape of said lens element in a predetermined manner so that the focus of said lens element can be changed in a continuous manner over a predetermined range, said stress exerting means comprising:

(a) a coil spring surrounding the periphery of said lens element and means by which said coil spring can be selectively caused to radially expand and contract with respect to said lens element central axis; and (b) means for attaching said lens element circumferential edge to said coil spring so that said expansive and contractive movement of said coil spring is transmitted to said lens element to alter the shape thereof.

* * * * *